(12) United States Patent
Pashalidis

(10) Patent No.: US 8,396,971 B2
(45) Date of Patent: Mar. 12, 2013

(54) METHOD FOR OPTIMIZING NSIS SIGNALING IN MOBIKE-BASED MOBILE APPLICATIONS

(75) Inventor: Andreas Pashalidis, Leimen (DE)

(73) Assignee: Siemens Aktiengesellschaft, Munich (DE)

(*) Notice: Subject to any disclaimer, the term of this patent is extended or adjusted under 35 U.S.C. 154(b) by 1017 days.

(21) Appl. No.: 12/311,439

(22) PCT Filed: Sep. 24, 2007

(86) PCT No.: PCT/EP2007/060088
§ 371 (c)(1),
(2), (4) Date: Mar. 30, 2009

(87) PCT Pub. No.: WO2008/037685
PCT Pub. Date: Apr. 3, 2008

(65) Prior Publication Data
US 2009/0241181 A1    Sep. 24, 2009

(30) Foreign Application Priority Data
Sep. 28, 2006 (DE) .......................... 10 2006 046 023

(51) Int. Cl.
*G06F 15/16* (2006.01)

(52) U.S. Cl. ..................... 709/227; 455/432.1; 709/230; 726/15

(58) Field of Classification Search ................... 709/227
See application file for complete search history.

(56) References Cited

U.S. PATENT DOCUMENTS

| 2004/0008689 A1 | 1/2004 | Chaskar |
| 2004/0203749 A1 | 10/2004 | Adrangi |
| 2006/0126645 A1 | 6/2006 | Devarapalli |
| 2006/0130136 A1 | 6/2006 | Ahmavaara |
| 2008/0310375 A1* | 12/2008 | Akram et al. ................. 370/338 |

FOREIGN PATENT DOCUMENTS

| EP | 1578083 A1 | 9/2005 |
| EP | 1677466 A1 | 7/2006 |
| JP | 2006-24982 | 1/2006 |
| WO | WO 2006032826 A1 | 3/2006 |
| WO | WO 2006083039 A1 | 8/2006 |

OTHER PUBLICATIONS

RFC 4555 'IKEv2 Mobility and Multihoming Protocol MOBIKE' (Jun. 2006) to Eronen.*
IETF draft 'GIST: General Internet Signaling Transport' (Aug. 31, 2006) to Schulzrinne et al.*
RFC 4621 Design of MOBIKE Protocol (Aug. 2006) to Kivinen et al.*

(Continued)

*Primary Examiner* — Phuoc Nguyen
*Assistant Examiner* — June Sison
(74) *Attorney, Agent, or Firm* — Staas & Halsey LLP

(57) ABSTRACT

A method reduces signaling overhead of a mobile node that maintains at least one active Next Steps in Signaling session. The mobile node has a MOBIKE connection to a virtual private network gateway, and changes its link to the Internet. At least the IP address of the VPN gateway and/or an address space corresponding to the subnetwork of the VPN gateway is/are inserted into the message routing information object contained in the NSIS message. A value is defined for a security parameter index. The SPI value is inserted into the MRI object. The S flag is set in the MRI object. An address space that refers to the IP address of the mobile node is inserted into the MRI object.

10 Claims, 2 Drawing Sheets

OTHER PUBLICATIONS

Next Steps in Signaling (NSIS) H. Cheng et al., "NSIS Flow ID and Packet Classification Issue", IETF Standard-Working Draft, Internet Engineering Task Force, IETF, CH, No. 2, Oct. 24, 2005: draft-cheng-nsis-flowid-issues-02.txt; Others.

Devarapalli Azaire Networks P. Eronen Nokia V: Secure Connectivity and Mobility using Mobile Ipv4 and MOBIKE; IETF Standard-Working-Draft, Internet Engineering Task Force, IETF, CH; vol. mip4, No. 1, Jun. 13, 2006,: draft-ietf-mip4-mobike-connectivity-01.txt; Others.

Request for Comments RFC4621: Kivinen Safenet T et al., Design of the IKEv2 Mobility and Multihoming (MOBIKE) Protocol, IETF Standard, Internet Engineering Task Force, IETF, CH, Aug. 1, 2006: rfc4621.txt http://www.rfc-editor.org/rfc/rfc4621.txt; Others.

\* cited by examiner

METHOD FOR OPTIMIZING NSIS SIGNALING IN MOBIKE-BASED MOBILE APPLICATIONS

CROSS REFERENCE TO RELATED APPLICATIONS

This application is based on and hereby claims priority to PCT Application No. PCT/EP2007/060088 filed on Sep. 24, 2007 and German Application No. 10 2006 046 023.5 filed on Sep. 28, 2006, the contents of which are hereby incorporated by reference.

BACKGROUND OF THE INVENTION

A Virtual Private Network (VPN) is a computer network that uses a public network, such as the Internet, for the transport of private data. Subscribers to a VPN can exchange data as in an internal local network (Local Area Network; LAN). The individual subscribers themselves do not have to be directly connected thereto. The connection via the public network is usually encrypted. A connection between a subscriber who is using what is known as a VPN client and his home network, which makes available what is known as a VPN server, is facilitated via a tunnel between the VPN client and the VPN server. In most cases the tunnel is then secured, but even an unsecured clear text tunnel can be used to connect a VPN client to a VPN server.

A VPN may, among other things, serves the purpose of providing employees who are away from an organization or a business with access to the internal network. To do so, the employee's computer establishes a VPN connection with a VPN gateway operated by the business. It is then possible for the employee to work via this connection as if he were working in the business's local area network.

In order to be able to facilitate secure transmission of data in VPNs, special protocols are required. A set of such protocols is known in combination as IP security (IPsec). This includes, among other things, the Internet Key Exchange Version 2 (IKEv2) protocol, which is responsible for generating the keys that are required by the cryptographic mechanisms for other protocols, too. A tunnel set up using IPsec for a VPN connection is also referred to as an IPsec tunnel. The Mobile Internet Key Exchange protocol (MOBIKE protocol) is an extension of the IKEv2 that is included in IPsec, allowing the VPN client to change its point of attachment to the network without the thus ensuing change in its Internet protocol (IP) address resulting in its VPN session having to be established once again.

In a typical VPN scenario, a VPN client and a VPN gateway exchange data via an IPsec tunnel. If the VPN client is a mobile node (MN), for example, a laptop, a palmtop, a Personal Digital Assistant (PDA) or suchlike, and if said node changes its Internet point of attachment, then its IP address also changes. The MOBIKE protocol specifies how said change of address can be handled effectively in the VPN scenario. If the MN has initiated a Next Steps In Signaling (NSIS) session for this tunnel, the state of all NSIS-enabled nodes that are taking part in signaling along the path of the tunnel then has to be updated when there is a change in the point of attachment, in order to be able to follow the change in the IP address of the MN. This process involves an overhead that becomes greater the more often the MN changes its point of attachment. Furthermore, an additional waste of resources can occur if the aforementioned NSIS nodes have reserved resources for the data stream through the IPsec tunnel. Such reservations of resources, such as transmission speed, bandwidth and suchlike are made, for example, where the signaling is a Quality of Service (QoS) signaling, for example, the QoS NSLP (Quality of Service NSIS Signaling Layer Protocol) created by the NSIS working group. The aforementioned waste of resources occurs because, in the interval between the change of address and the aforementioned update of the state, the resources that have been reserved are not available either to the data stream in the IPsec tunnel, or elsewhere. This likewise means that the data stream cannot make use of the resources reserved for its use until all the NSIS nodes along the path have been updated. This again means that initially agreed QoS guarantees cannot be upheld. The user becomes aware thereof because the transmission speed, for example, is clearly slower.

There are no solutions known from the related art that allow an optimization of the NSIS signaling when there is a change in the point of attachment for the MN in MOBIKE environments. The reports produced by the NSIS working group describe only the basic methods for using NSIS signaling protocols in mobile scenarios. These methods require the MN to send signaling messages whenever its IP address changes. The purpose of these messages is to update the states of the NSIS nodes involved in the signaling session with the current IP address of the MN.

SUMMARY

One potential object is therefore that of providing a method that prevents the aforementioned delays and the associated waste of resources.

The inventor proposes a method for reducing signaling overhead and reducing the waste of resources that may occur if a mobile node that maintains at least one Next Steps In Signaling session and has a MOBIKE connection to a VPN gateway changes its point of attachment to the Internet comprises the following process steps:

The IP address of the VPN gateway and/or an address space corresponding to the subnetwork of the VPN gateway is/are inserted into the message routing information (MRI) object contained in the NSIS message according to the General Internet Signaling Transport (GIST) protocol, a value is defined for a security parameter index (SPI), the SPI value is inserted into the MRI object, the S flag defined in GIST is set in the MRI object and an address space that refers to the IP address of the MN is inserted into the MRI object.

The address space that refers to the IP address of the mobile node is indicated by stating an IP address of the MN and a prefix. The prefix indicates which part of the IP address of the MN can change without the IP address of the MN leaving the dedicated address space. According to the GIST standard, the NSIS nodes taking part in the signaling session use the IP address range that is defined by the pair that encompasses the IP address of the MN and the prefix in order to identify the packets that belong to the data, stream of the IPsec tunnel. To be more precise, data packets belong to the data stream if the MN's IP address indicated in the IP header is in this address range. If the MN's IP address changes within this address range, it is no longer necessary to update the states of the NSIS nodes along the path of the IPsec tunnel. As a result thereof, the overhead and any potential waste of resources can be effectively reduced or avoided. The data stream between the MN and the MOBIKE server can continue to flow without any delays.

An advantageous embodiment of the proposed method makes provision for an address space for the IP address of the MN to be indicated in the MRI object. Said space encompasses the possible IP addresses for the MN that can be anticipated, taking into account the usual movement of the MN. It is conceivable in such a case for the movements of the MN to be monitored and for the IP addresses assigned to the MN during its movement to be stored in order to derive therefrom a preferred movement profile and an address space that encompasses the IP addresses assigned to the MN within the preferred movement space thereof that has been derived.

According to an advantageous embodiment, provision is made for the MN to indicate preferably only one single IP address for the VPN gateway in the MRI object and restrict the address space for its own IP address as far as possible. This is useful if the MN is currently moving only within the address space that pertains to its present IP address and that is assigned to its access network. Such a case frequently occurs in networks operated by large businesses or organizations, within which the MNs can move freely. Address spaces can be indicated by specifying an IP address that is within the address space and a range by which a new IP address can deviate from the predefined IP address. By restricting as much as possible the address space within which its IP address is located, the MN reduces the likelihood of collisions.

In all the aforementioned embodiments of the method it is conceivable for the SPI value to be established by the VPN gateway in such a way that collisions between various IPsec tunnels existing between different MNs and the same VPN gateway are avoided. The VPN gateway is in a position to define the SPI values in such a way that the same SPI values are not used within the VPN for a plurality of different MN to VPN IPsec tunnels established according to the MOBIKE standard. In view of the fact that the SPI value has 32 characters, corresponding to $2^{32}$ possible different SPI values, this is sufficient for most applications.

It is likewise conceivable for the SPI value to be selected at random, or defined using an appropriate function by the NSIS session identifier or other appropriate data. Defining the value at random is a very simple and cost effective procedure and it is very improbable that a randomly selected SPI value for the VPN to MN tunnel of an MN will coincide with the SPI values for other MNs.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
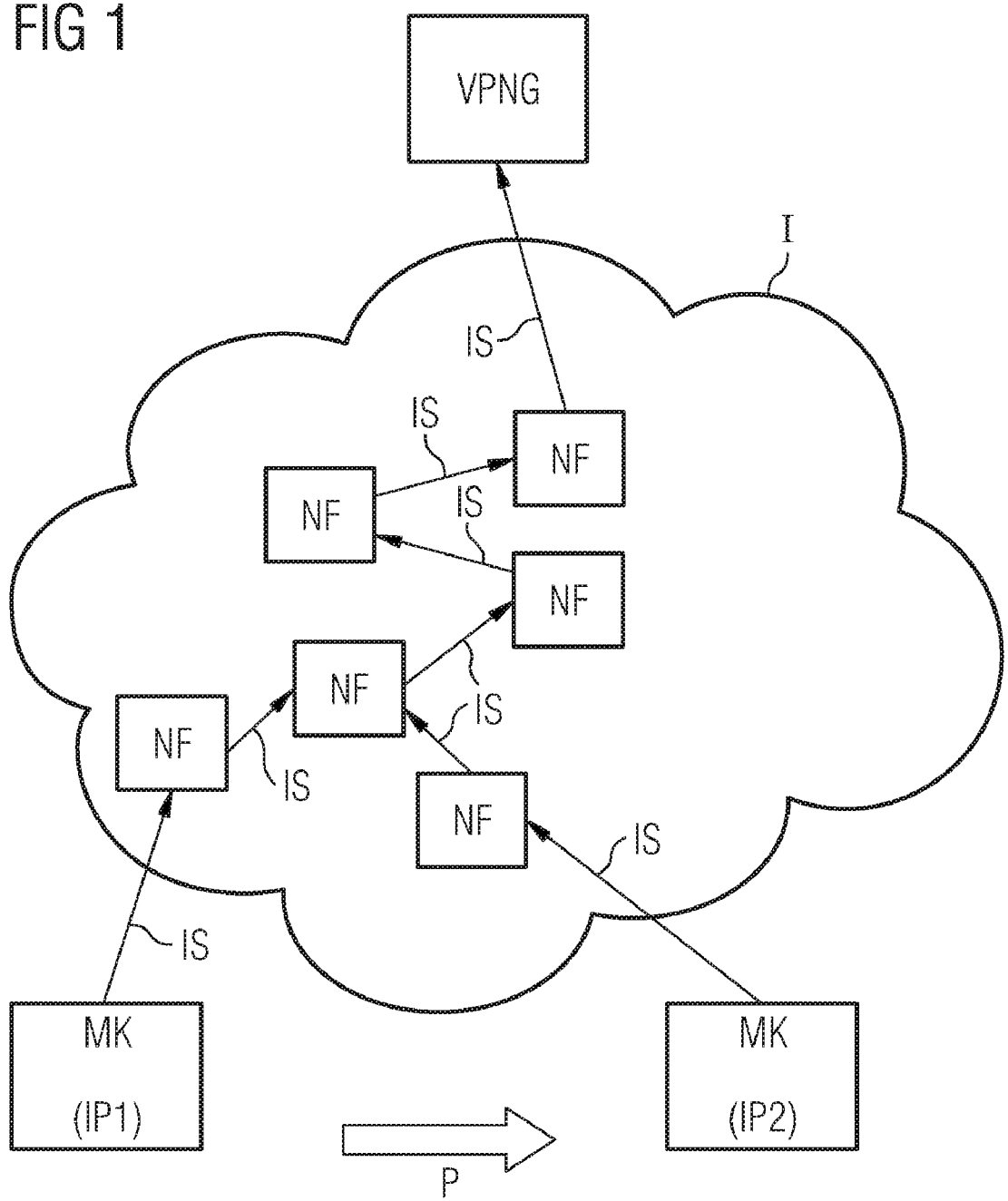
FIG. 1 a diagrammatic view of an IPsec tunnel between an MN and a VPN gateway running through a plurality of NSIS nodes and FIG. 2 a diagrammatic view of the procedure for a method proposed herein.

Reference will now be made in detail to the preferred embodiments of the present invention, examples of which are illustrated in the accompanying drawings, wherein like reference numerals refer to like elements throughout.

In a scenario shown diagrammatically in FIG. 1, in which a mobile node MN which
a) has an IPsec connection to a VPN gateway VPNG managed through MOBIKE, and
b) is taking part in an NSIS-signaling session
changes its IP address, the signaling state already installed in the NSIS node NF located along the tunnel path becomes invalid and has to be updated. In FIG. 1, the arrows marked IS denote the IPsec connection managed through MOBIKE. The arrow P indicates that the MN is moving. This movement has the effect that, instead of its previous IP address IP1, the MN is assigned a new IP address IP2, since its point of attachment to the VPN Gateway VPNG on the Internet I changes. The MOBIKE protocol then has to update the state at the VPN Gateway VPNG. The NSIS nodes that are denoted by NF, for NSIS Forwarder, are those nodes whose states have to be updated after movement of the MN. This results in the following problems:

The signaling for the update has to be initiated. This already constitutes an overhead in itself.

The data stream, that is, the transmission of the data packets along the IPsec tunnel, does not receive the treatment designated by the signaling until the states of all the NSIS nodes along the tunnel path have been updated. This has an adverse effect on the capacity of the connection, and a user may even incur costs for services that he does not receive or receives only to a limited extent as a result of the delay.

Until all the states of the NSIS nodes along the tunnel path have been updated, resources have to be kept free for signaling sessions that are not constantly in progress, which is a waste of resources.

Figure 2:
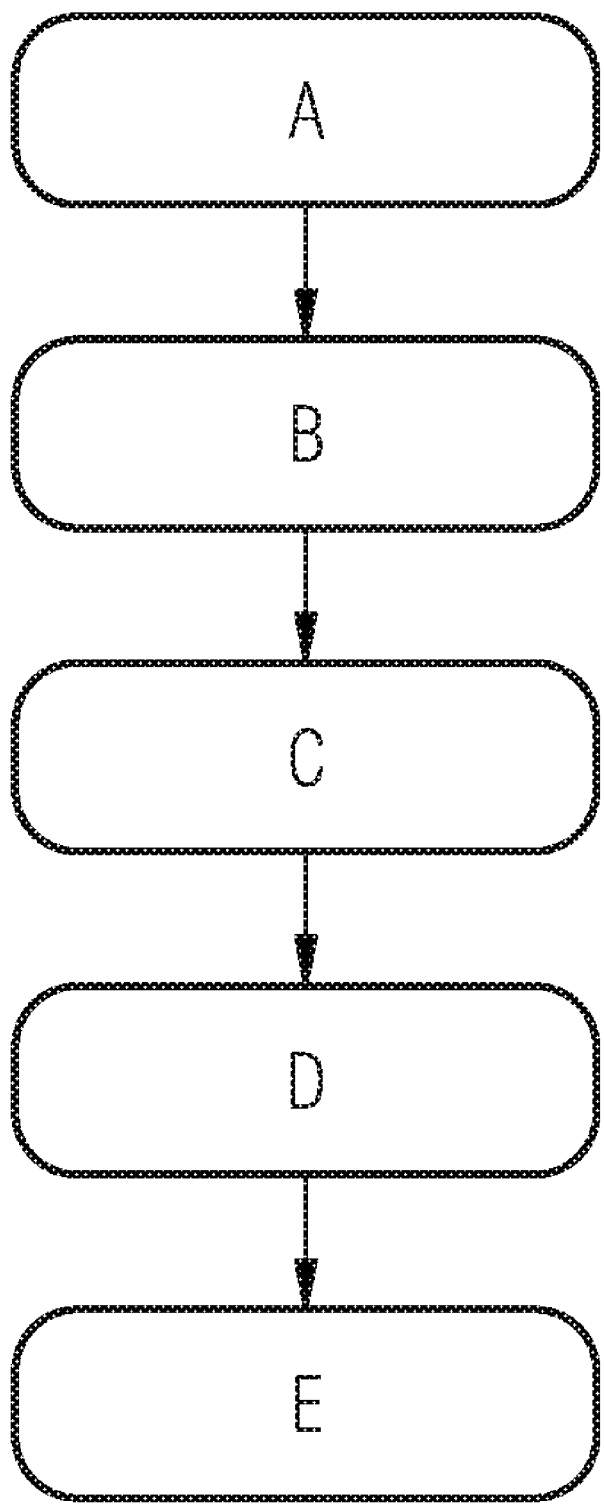

The aforementioned problems are solved by the proposed method, the procedure for which is shown diagrammatically in FIG. 2, for reducing the overhead of an NSIS message from an MN in a VPN when there is a change in the point of attachment of the MN to the VPN, the MN being connected to a VPN gateway via an IPsec tunnel, the path of which runs via at least one NSIS node.

A first process step A provides for at least the IP address of the VPN gateway and/or of an address space corresponding to the subnetwork of the VPN gateway to be inserted into the MRI object contained in the NSIS message.

In a second process step B, an SPI value is defined.

In a third process step C, the SPI value is inserted into the MRI object contained in the NSIS message.

In a fourth process step D, the S flag is set in the MRI object.

In a fifth process step E, an address space that refers to the IP address of the MN is inserted into the MRI object. This can be achieved, for example, by indicating the IP address of the MN, together with a prefix.

The MRI object designated in the GIST protocol also allows an address space to be indicated in addition to one single IP address. An MN that changes its point of attachment within a specific access network can therefore also indicate in the MRI object, by a prefix, for example, an address space that includes the whole address space for the access network via which the MN is currently connected, or within which the point of attachment of the mobile node is located. An MN that changes between different access networks can likewise indicate in the MRI object the whole IP address space within which the MN usually moves.

On the other hand, the VPN gateway has in most cases only one single IP address or only very few IP addresses belonging to one single IP subnetwork. For this reason, it is sufficient in most cases to indicate in the MRI object one single IP address for the gateway or again, for example, to indicate with a prefix an address space that corresponds to the subnetwork of the gateway.

The NSIS nodes along the path of the tunnel use, in conjunction with other header fields, the Security Parameter Index (SPI) in order to identify the data traffic to which the signaling messages refer. In order for this to function, the signaling messages for the IPsec tunnel are designed in such a way that they contain the optional SPI field in the path-coupled MRI object. In addition to this, the S flag for the MRI object has to be set.

Since the SPI values are only 32 bits long, it can happen that the same SPI value is selected for the IPsec tunnels of two different MNs. This results in a collision if both the MNs are connected to the same VPN gateway and if they use the same address space or the same prefix, that is, are moving in the same address space. Such collisions are undesirable because those NSIS nodes that are located in a section common to the pathways for both tunnels are not in a position to differentiate between the data packets belonging to the different tunnels. Basically, there are a plurality of conceivable methods with which the occurrence of such collisions can be avoided. Four different options are listed below by way of example:

The VPN gateway does not select the same SPI values for a plurality of different MN to VPN IPsec tunnels designed according to the MOBIKE standard. In view of the fact that the SPI value has 32 characters, corresponding to $2^{32}$ possible different SPI values, this should be considered sufficient for most applications.

The NSIS nodes are intended to be aligned not only with the SPI value in the data packets but also with the IP address range of the MN, which range is indicated in the MRI object. This procedure essentially corresponds to the standard Geist (German Encyclopedic Internet Service Terminal) procedure.

In order for the aforementioned measures to be beneficial, in the MRI object the MN should indicate one single IP address for the VPN gateway and restrict the address space for its own IP address as far as possible. This is useful if the MN currently has the address 155.234.15.6, for example, and is moving only within the subnetwork of the 155.234 class B network. Such a case frequently occurs in the networks operated by large businesses and organizations, within which the employees can move freely with their devices designated as MNs. In the above example, the MN indicates in the MRI object its current IP address, together with a prefix of 16.

The MN selects an SPI value for the VPN to MN tunnel, which value is very unlikely to correspond with the SPI values of other MNs. For this purpose, the SPI value is selected at random, for example, or determined using an appropriate function by the NSIS session identifier.

The proposed method is industrially applicable particularly in the production and marketing of virtual private networks which can be used by mobile terminals and of network components for such networks.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for connecting a mobile node to the Internet, comprising:
    connecting the mobile node to a virtual private network at a point of attachment;
    maintaining at least one active Next Steps In Signaling session between the mobile node and the virtual private network, the NSIS session being maintained using an NSIS message having a message routing information (MRI) object;
    connecting to a gateway of the virtual private network via a Mobile Internet Key Exchange protocol (MOBIKE) connection;
    defining a value for a security parameter index (SPI);
    inserting the value for the security parameter index into the MRI object contained in the NSIS message;
    setting an S flag in the MRI object;
    defining a restricted address space that refers to an IP address of the mobile node and a prefix for the IP address of the mobile node, the prefix relating to a permissible range of IP addresses for the mobile node;
    inserting the address space into the MRI object;
    changing the point of attachment for the mobile node to connect to the Internet;
    changing the IP address of the mobile node to an updated IP address within the permissible range of IP addresses for the mobile node, without updating states of NSIS nodes along the connection; and
    using the address space and the value for the security parameter index to identify traffic associated with the mobile node.

2. The method as claimed in claim 1, wherein the prefix indicates which part of the IP address of the mobile node can change without the IP address of the mobile node leaving the respective address space.

3. The method as claimed in claim 1, wherein the address space for the mobile node encompasses possible IP addresses for the mobile node, taking into account previous movements of the mobile node.

4. The method as claimed in claim 1, wherein
    different mobile nodes connect to the gateway of the virtual private network using different IP security (IPsec) tunnels, and
    the value of the security parameter index is defined by the gateway of the virtual private network such that collisions between IPsec tunnels that exist between different mobile nodes and the gateway of the virtual private network are avoided.

5. The method as claimed in claim 1, wherein the value of the security parameter index is selected at random, or defined based on a NSIS session identifier.

6. A method for reducing signaling overhead of a mobile node that maintains at least one active Next Steps In Signaling (NSIS) session between the mobile node and a virtual private network and likewise has a Mobile Internet Key Exchange protocol (MOBIKE) connection to a virtual private network (VPN) gateway and changes its point of attachment to the Internet, comprising:
    inserting an Internet Protocol (IP) address of the VPN gateway or an address space corresponding to a subnetwork of the VPN gateway into a message routing information (MRI) object contained in an NSIS message;
    defining a value for a security parameter index (SPI);
    inserting the value for the SPI index into the MRI object;
    setting an S flag in the MRI object;

defining a restricted address space for the mobile node that refers to an IP address of the mobile node and a prefix, the prefix relating to a permissible range of IP addresses for the mobile node;

inserting the address space into the MRI object; and changing the IP address of the mobile node to an updated IP address within the permissible range of IP addresses for the mobile node, without updating states of NSIS nodes along the connection.

7. A method for connecting a mobile node to the Internet, comprising:

connecting the mobile node to a virtual private network at a point of attachment;

maintaining at least one active Next Steps In Signaling session between the mobile node and the virtual private network, the NSIS session being maintained using an NSIS message having a message routing information (MRI) object;

connecting to a gateway of the virtual private network via a Mobile Internet Key Exchange protocol (MOBIKE) connection, to establish a connection between the mobile node and the gateway;

defining a value for a security parameter index (SPI);

inserting the value for the security parameter index into the signaling message;

defining restricted address space that includes an IP address of the mobile node and a prefix for the IP address of the mobile node, the prefix relating to a permissible range of IP addresses for the mobile node;

inserting the address space into the signaling message;

changing the point of attachment for the mobile node to connect to the Internet;

changing the IP address of the mobile node to an updated IP address within the permissible range of IP addresses for the mobile node, without updating states of NSIS nodes along the connection; and using the address space and the value for the security parameter index to identify traffic associated with the mobile node.

8. The method as claimed in claim 1, further comprising:

changing the IP address of the mobile node to an unexpected IP address outside of the permissible range of IP addresses for the mobile node; and updating all NSIS nodes along the connection based on the unexpected IP address.

9. The method as claimed in claim 6, further comprising:

changing the IP address of the mobile node to an unexpected IP address outside of the permissible range of IP addresses for the mobile node; and updating all NSIS nodes along the connection based on the unexpected IP address.

10. The method as claimed in claim 7, further comprising:

changing the IP address of the mobile node to an unexpected IP address outside of the permissible range of IP addresses for the mobile node; and updating all nodes along the connection based on the unexpected IP address.

* * * * *